(12) United States Patent
Lewin

(10) Patent No.: US 6,362,717 B1
(45) Date of Patent: Mar. 26, 2002

(54) COIL ASSEMBLY

(75) Inventor: Doug G. Lewin, Cement City, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/363,450

(22) Filed: Jul. 29, 1999

(51) Int. Cl.⁷ .............................................. H01F 27/26
(52) U.S. Cl. ........................ 336/210; 336/83; 336/98; 335/220
(58) Field of Search ............................... 335/220–229; 336/233, 83, 98, 210, 211, 212, 213, 197, 198; 251/129.15

(56) References Cited

U.S. PATENT DOCUMENTS

| | | | |
|---|---|---|---|
| 3,497,845 A | * | 2/1970 | Bernier ........................ 336/197 |
| 3,730,146 A | * | 5/1973 | Moulds et al. ................. 336/30 |
| 3,859,614 A | * | 1/1975 | Reithmaier ................... 336/198 |
| 4,186,363 A | | 1/1980 | Schmidt, Jr. et al. |
| 4,439,751 A | | 3/1984 | Gibas |
| 4,728,916 A | | 3/1988 | Fontecchio et al. |
| 5,198,790 A | * | 3/1993 | Elow ............................ 336/210 |
| 5,533,249 A | * | 7/1996 | Wakeman .................. 29/602.1 |
| 5,601,275 A | * | 2/1997 | Hironaka ................ 251/129.15 |
| 6,065,734 A | * | 5/2000 | Tackett et al. .......... 251/129.15 |
| 6,086,042 A | * | 7/2000 | Scott et al. ............. 251/129.15 |
| 6,142,445 A | * | 11/2000 | Kawaguchi et al. ... 251/129.15 |

FOREIGN PATENT DOCUMENTS

FR 1515330 * 1/1968 .................. 336/198

* cited by examiner

Primary Examiner—Lincoln Donovan
(74) Attorney, Agent, or Firm—MacMillan, Sobanski & Todd, LLC (57) ABSTRACT

A coil assembly comprises a bobbin for supporting a coil. The bobbin supports a metal ferrule. A metal bracket is releasably coupled to the bobbin. The bracket holds the ferrule in place. The ferrule and the bracket are arranged to cooperatively serve as a return path for magnetic flux. A method for assembling a solenoid valve may comprise the steps of coupling a flux return structure about a coil, connecting the coil to an electrical circuit, and orienting the coil about the armature of the valve.

5 Claims, 14 Drawing Sheets

COIL ASSEMBLY

CROSS-REFERENCE TO RELATED APPLICATIONS

This application is a request for continued examination of co-pending U.S. patent application Ser. No. 09/363,450, filed on Jul. 29, 1999.

BACKGROUND

An Anti-lock Brake System (ABS) is often included as standard equipment on new vehicles. When actuated, the ABS is operative to control the operation of some or all of the vehicle wheel brakes. A typical ABS includes a plurality of solenoid valves mounted within a control valve body and connected to the vehicle hydraulic brake system. Usually, a separate hydraulic source, such as a motor driven pump, is included in the ABS for reapplying hydraulic pressure to the controlled wheel brakes during an ABS braking cycle. The pump is typically included within the control valve body while the pump motor is mounted upon the exterior of the control valve body.

An ABS further includes an electronic control module, which has a microprocessor. The control module is electrically coupled to the pump motor, a plurality of solenoid coils associated with the solenoid valves and wheel speed sensors for monitoring the speed of the controlled wheels. The control module is typically mounted upon the control valve body to form a compact unit, which is often referred to as an ABS electro-hydraulic control unit.

During vehicle operation, the microprocessor in the ABS control module continuously receives speed signals from the wheel speed sensors. The microprocessor monitors the speed signals for potential wheel lock-up conditions. When the vehicle brakes are applied and the microprocessor senses an impending wheel lock-up condition, the microprocessor is operative to actuate the pump motor and selectively operate the solenoid valves in the control unit to cyclically relieve and reapply hydraulic pressure to the controlled wheel brakes. The hydraulic pressure applied to the controlled wheel brakes is adjusted by the operation of the solenoid valves to limit wheel slippage to a safe level while continuing to produce adequate brake torque to decelerate the vehicle as desired by the driver.

Figure 1:
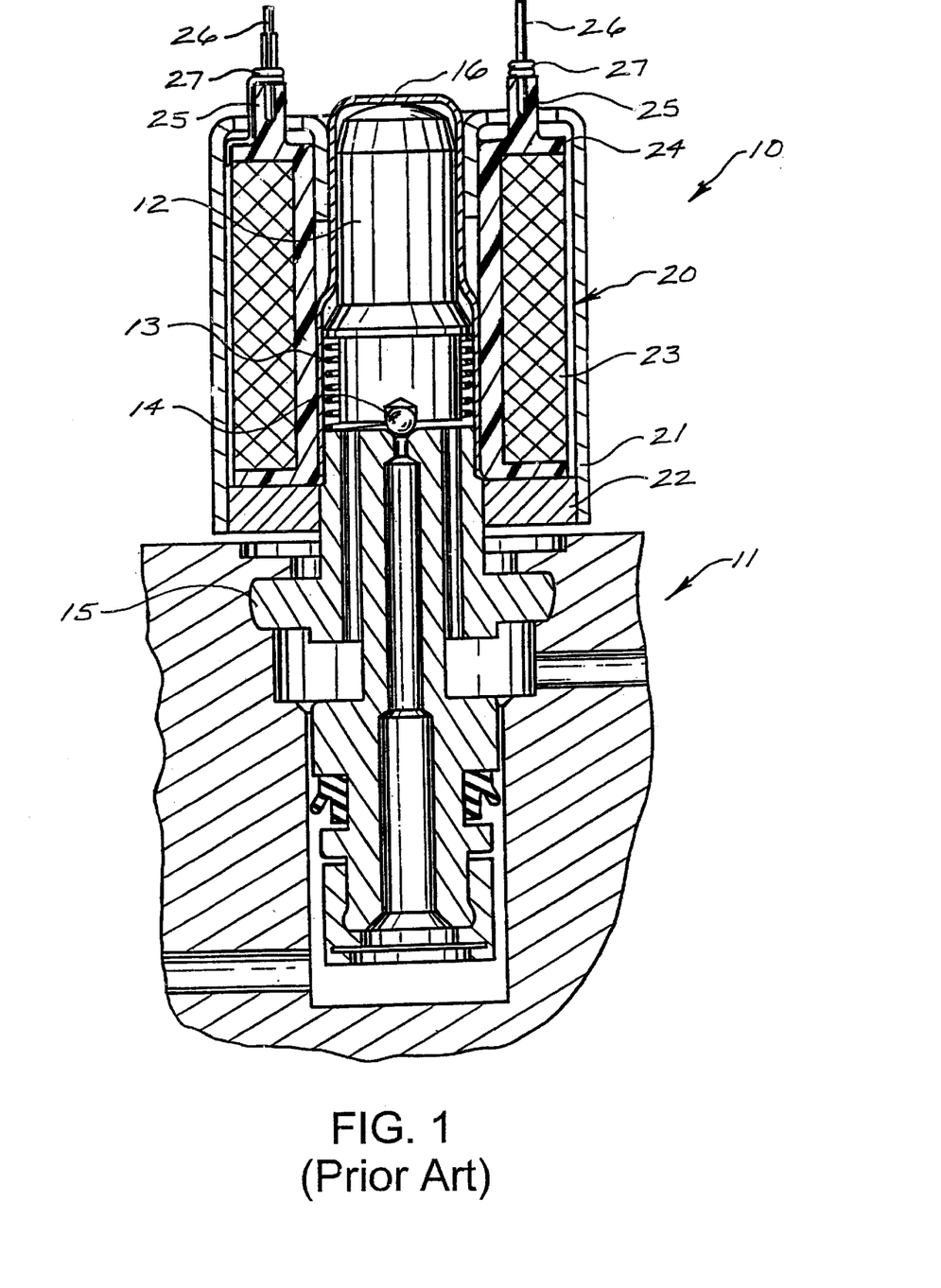
FIG. 1 is a sectional view of an ABS solenoid valve according to the prior art.

Referring now to FIG. 1, there is shown a sectional view of a typical ABS solenoid valve 10 mounted upon an ABS control valve body 11. The valve 10 includes an axially shiftable armature 12 which is biased in an upward direction by a spring 13 such that a ball valve, generally represented by a reference numeral 14, is maintained in a normally open position. The ball valve 14 cooperates with a valve seat member 15 which is mounted in the valve body 11. The armature 12 is slidably disposed within a valve sleeve 16 having a closed end. A solenoid coil 20 is carried by the valve sleeve 16 and surrounds the armature 12. The coil 20 is enclosed by a metal flux return casing 21. An annular flux ring 22 is disposed within the open end of the flux casing 21. The flux return casing 21 and flux ring 22 complete a magnetic flux path which passes through the armature 12 and the valve seat member 15.

The solenoid coil 20 is of conventional design, comprising a winding 23 formed from multiple turns of an insulated magnet wire having a round cross-section, such as #28½ magnet wire. The coil wire is helically wound upon a plastic bobbin 24. A pair of terminal pin supports 25 extend in an axial direction from the top of the bobbin 24. Each of the supports 25 is molded over a terminal pin 26. A lead wire 27 of the coil winding wire is wound around the base of each of the terminal pins 26 and soldered thereto. The pins 26 are electrically coupled to the ABS microprocessor.

When it is necessary to actuate the valve 10 during an anti-lock braking cycle, an electric current is supplied through the terminal pins 26 to the coil 20. The current establishes a magnetic field in the armature 12, which pulls the armature 12 in a downward direction, closing the ball valve 14. When the current is interrupted, the magnetic field collapses, allowing the spring 13 to return the armature 12 to its original position, thereby reopening the ball valve 14. An ABS control unit also typically includes other solenoid valves, such as normally closed solenoid valves (not shown), which have structures similar to the normally open valve 10 described above.

SUMMARY

The invention is directed to a coil assembly comprising a bobbin for supporting a coil. The bobbin supports a metal ferrule. A metal bracket is releasably coupled to the bobbin. The bracket holds the ferrule in place. The ferrule and the bracket are arranged to cooperatively serve as a return path for magnetic flux. The invention is also directed to a method for assembling a coil assembly.

Various objects and advantages of this invention will become apparent to those skilled in the art from the following detailed description of the preferred embodiment, when read in light of the accompanying drawings.

DESCRIPTION

Figure 2:
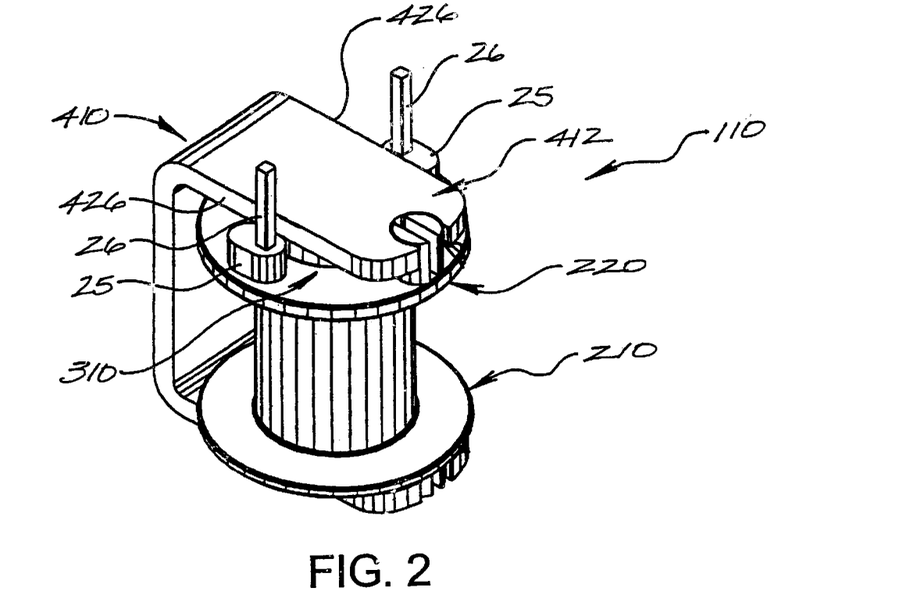
FIG. 2 is a perspective view of a bobbin, a flux return ferrule and a flux return bracket according to the invention.

Referring once again to the drawings, there is illustrated in FIG. 2 an improved coil assembly 110. The coil assembly 110 comprises an insulated spool or bobbin 210 for supporting a coil 20 (shown in FIG. 8), and a metal ferrule 310 and a metal bracket 410 which cooperatively serve as a return path for magnetic flux. Components of the present invention which are the same as the valve 10 shown in FIG. 1 are identified by the same numerical designator.

Figure 3:
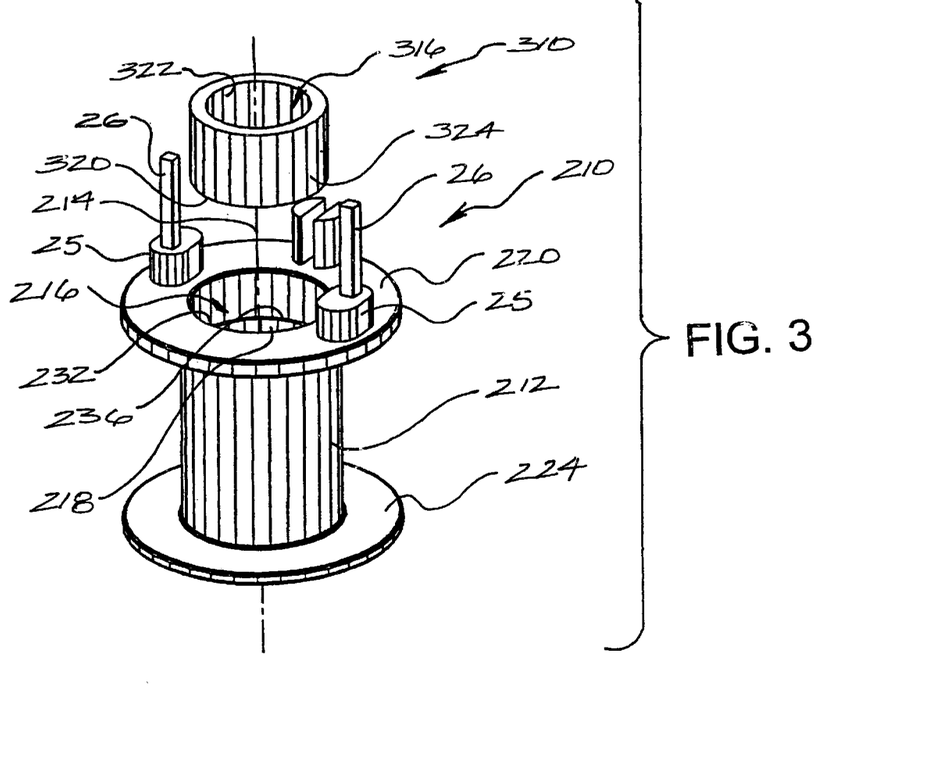
FIG. 3 is an exploded perspective view of the bobbin and ferrule shown in FIG. 2.

As shown in FIG. 3, the bobbin 210 includes a cylinder 212 having upper and lower flanges 220 and 224 and a bore 216 coaxial with the axis 214 of the bobbin 210. The coil 20 (shown in FIG. 8) is wound upon the cylinder 212 between the upper and lower flanges 220 and 224. The bore 216 is provided to receive a valve armature 12 (shown in FIG. 8).

As is shown in the drawings, the upper flange 220 has terminal pin supports 25 extending in a perpendicular direction therefrom, each of which supports a terminal pin 26. The coil 20 (shown in FIG. 8) is formed from a number of turns of insulated electrically conductive material, which in the preferred embodiment is wire, and is used to produce magnetic flux. The electrically conductive material has opposing ends or leads 27 (shown in FIG. 1). Each end 27 is connected to a respective one of the terminal pins 26. For example, the coil 20 may be formed of a strand of insulated copper wire having opposing ends. The copper wire is wound about the cylinder 212 between the upper and lower flanges 220 and 224. Each end of the copper wire is wrapped around a respective one of the terminal pins 26.

Figure 6:
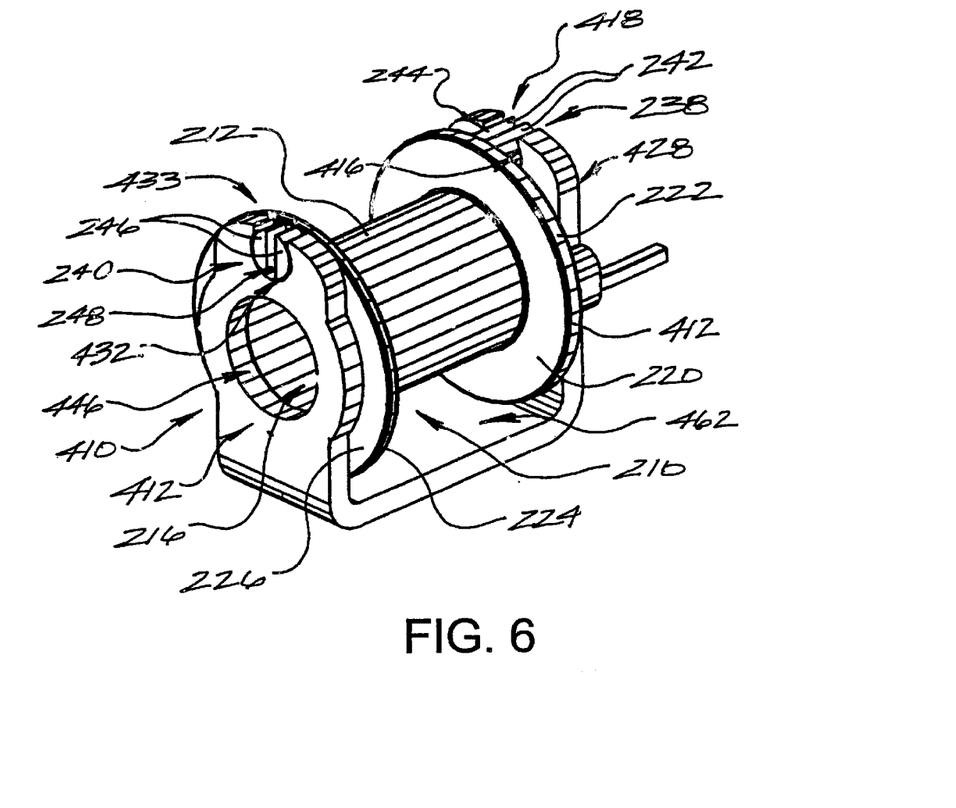
FIG. 6 is a bottom perspective view of the bobbin, ferrule and bracket shown in FIG. 2.

As shown in the drawings, the upper flange 220 further supports an upper coupling element, generally indicated at 238 (shown in FIG. 6), and the lower flange 224 supports a lower coupling element, generally indicated at 240 (also shown in FIG. 6). More particularly, the upper flange 220 preferably has an upper surface 222 (shown more clearly in FIG. 4) from which extends a pair of spaced upper semi-cylindrical flanges 242. The upper semi-cylindrical flanges 242 are separated by a slot 244. Similarly, the lower flange 224 preferably has a lower surface 226 from which extends a pair of spaced lower semi-cylindrical flanges 246. These flanges 246 are likewise separated by a slot 248.

The upper end (shown but not referenced) of the bobbin 210 has an annular recess 232 for receiving a cylindrical metal ferrule 310. The annular recess 232 is formed in an upper end of the cylinder 212 coaxial with the bore 216 therein. The annular recess 232 is defined by an enlarged diameter portion of the bore 216. A shoulder 236 is defined by an annular surface extending between a reduced diameter portion 218 of the bore 216 and the enlarged diameter portion of the bore 216.

Figure 4:
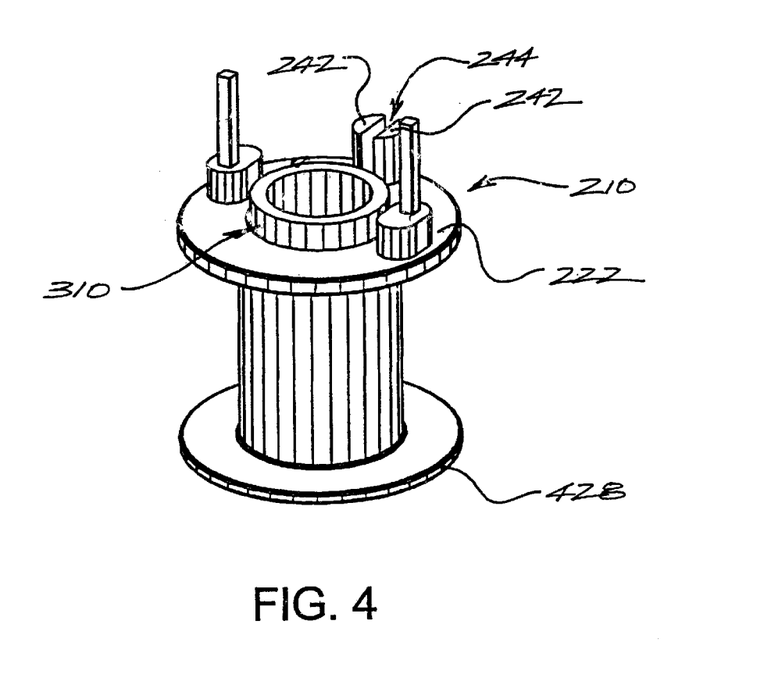
FIG. 4 is a perspective view of the bobbin and ferrule shown in FIG. 2.
Figure 5:
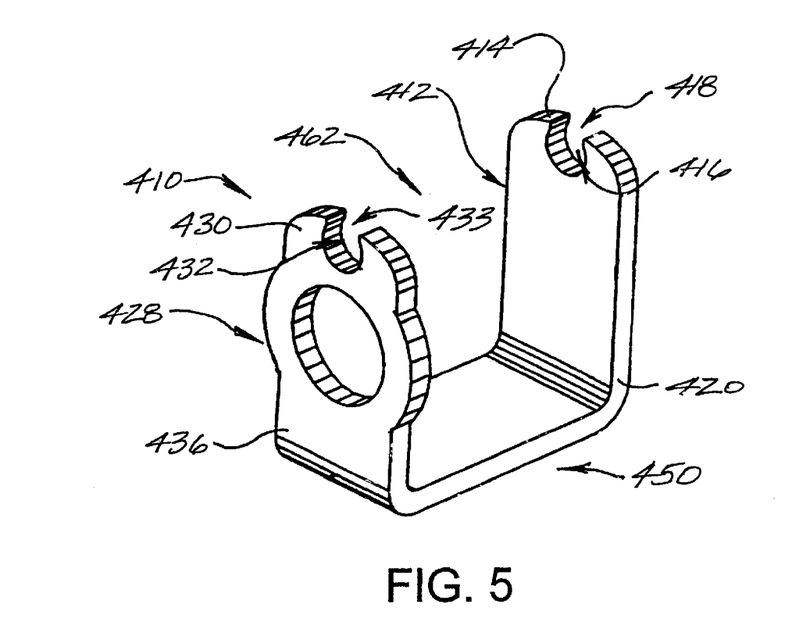
FIG. 5 is a bottom perspective view of a flux return bracket shown in FIG. 2.

The ferrule 310 is insertable in to the annular recess 232. The ferrule 310 includes a coaxial bore 316 formed therethrough which may be arranged coaxial with the bobbin bore 216. The ferrule 310 has an outer surface 324 dimensioned to fit snugly within the annular recess 232. The lower end 320 of the ferrule 310 is engageable with the shoulder 236 to restrict the travel of the ferrule 310 beyond the shoulder 236, as shown in FIG. 4. In the preferred embodiment, one end of the ferrule 310 extends axially from the bobbin bore 216, as best seen in FIG. 4. The bore 316 in the ferrule 310 is defined by an inner surface 322 of the ferrule 310. The bore 316 in the ferrule 310 is preferably structured and dimensioned to align coaxially with the bore 216 in the cylinder 212 of the bobbin 210. More particularly, the inner surface 322 defining the bore 316 in the ferrule 310 is preferably adapted to be flush with the inner surface defined by reduced diameter portion 218 of the bore 216 in the cylinder 212 of the bobbin 210 upon inserting the ferrule 310 into the annular recess 232.

The ferrule 310 is held in the annular recess 232 by a metal bracket 410. The bracket 410 is C-shaped in construction, having an upper leg 412, a lower leg 428, and a central portion 450 spanning or extending between the upper and lower legs 412 and 428. A space, generally indicated at 462, defined between the upper and lower legs 412 and 428 is dimensioned to receive the bobbin 210 with the ferrule 310 therein.

The upper leg 412 of the bracket 410 has a distal or terminal end 414 and a proximal end 420. The terminal end 414 is preferably provided with a notch or cutout 416. In the preferred embodiment, the cutout 416 is substantially cylindrical in shape. The cutout 416 preferably communicates with the terminal end 414 via a captive or restrictive opening 418. The lower leg 428 likewise has a distal or terminal end 430 and a proximal end 436. The terminal end 430 of the lower leg 428 is also preferably provided with a substantially cylindrical cutout 432 that communicates with the terminal end 430 of the lower leg 428 via a restrictive opening 433.

As shown in FIG. 6, the restrictive openings 418 and 433 cooperate with coupling elements 238 and 240 supported by the bobbin 210 to releasably couple the bracket 410 to the bobbin 210. As the bobbin 210 is inserted in the space 462 defined between the upper and lower legs 412 and 428 of the bracket 410, the upper and lower semi-cylindrical flanges 242 and 246 approach the restrictive openings 418 and 433. Upon entering the restrictive openings 418 and 433, the semi-cylindrical flanges 242 and 246 laterally converge towards one another, reducing the cross-section of the slots 244 and 248 therebetween. The bobbin 210 has a resilient character that causes the semi-cylindrical flanges 242 and 246 to bias outward in opposition to the lateral convergence of the semi-cylindrical flanges 242 and 246. Once beyond or through the restrictive openings 418 and 433 and into the cutouts 416 and 432, the semi-cylindrical flanges 242 and 246 diverge so as to be retained in the cutouts 416 and 432, thus forming a snap fit between the bobbin 210 and the bracket 410.

Figure 7:
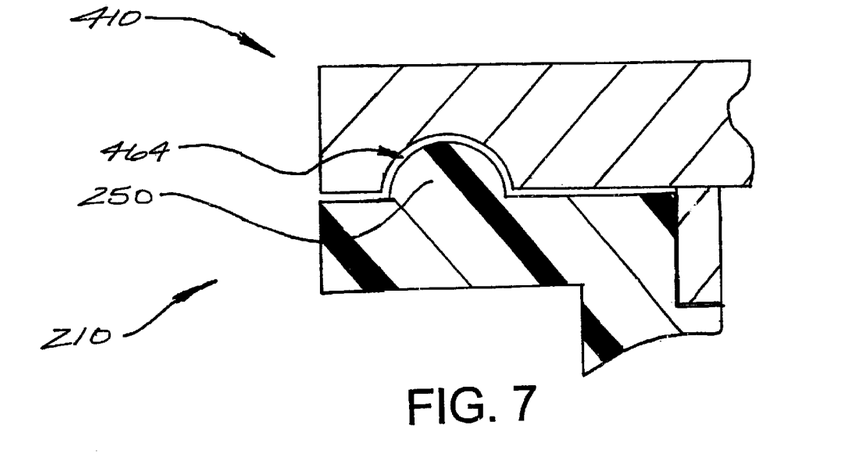
FIG. 7 is an enlarged sectional view of an alternative-coupling configuration.

The foregoing coupling configuration is provided for illustrative purposes. Other coupling configurations may be suitable for carrying out the invention. One such configuration is shown in FIG. 7. This configuration includes a nodule 250 and a relief 464 for receiving the nodule 250. As shown in the drawings, the nodule 250 may be supported by the bobbin 210 and the relief 464 may be supported by the bracket 410. Alternatively, the nodule 250 may be supported by the bracket 410 and the relief 464 may be supported by the bobbin 210. The nodule 250 and the relief 464 cooperate to couple the bracket 410 to the bobbin 210.

As best seen in FIG. 2, the upper leg 412 has opposing sides 426 and 426' which define the width of the leg 412. The width of the leg 412 is preferably dimensioned so as to fit between the terminal pin supports 25 extending from the upper flange 220 of the bobbin 210. The leg 412 preferably fits between the terminal pin supports 25 so that the terminal pin supports 25, which are made of an insulated material, insulate the bracket 410 from the terminal pins 26.

Referring back to FIG. 6, the lower leg 428 is illustrated as having a hole or aperture, generally indicated at 446, extending transversely therethrough. The lower leg 428 preferably has an enlarged cross-sectional portion about the hole 446 which serves to provide annular support about the hole 446. The hole 446 in the lower leg 428 is preferably arranged and dimensioned to align coaxially with the bore 216 in the bobbin cylinder 212 upon coupling the bracket 410 to the bobbin 210.

Figure 10:
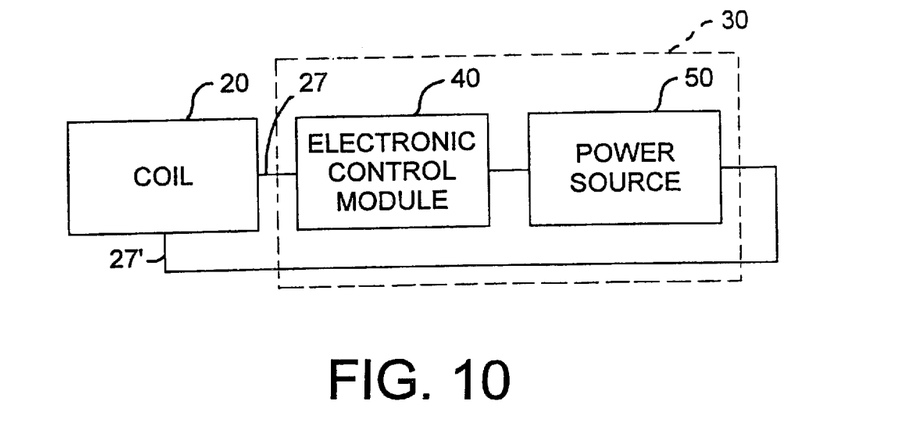
FIG. 10 is a schematic representation of a coil and an electrical circuit.

After coupling the bobbin 210 to the bracket 410, the terminal pins 26 are connected to an electrical circuit 30, such as illustrated in FIG. 10. Accordingly, the terminal pins 26 are soldered to a printed circuit board (PCB), such as the PCB 31 shown in FIG. 8. The electrical circuit 30 functions to introduce electrical current through the coil 20 to energize the coil 20. The coil 20, when energized, produces magnetic flux. As stated above, the ferrule 310 and the bracket 410 (shown in FIGS. 3 and 4) cooperatively serve as a return path for the magnetic flux. This will become more apparent in the description below.

Figure 8:
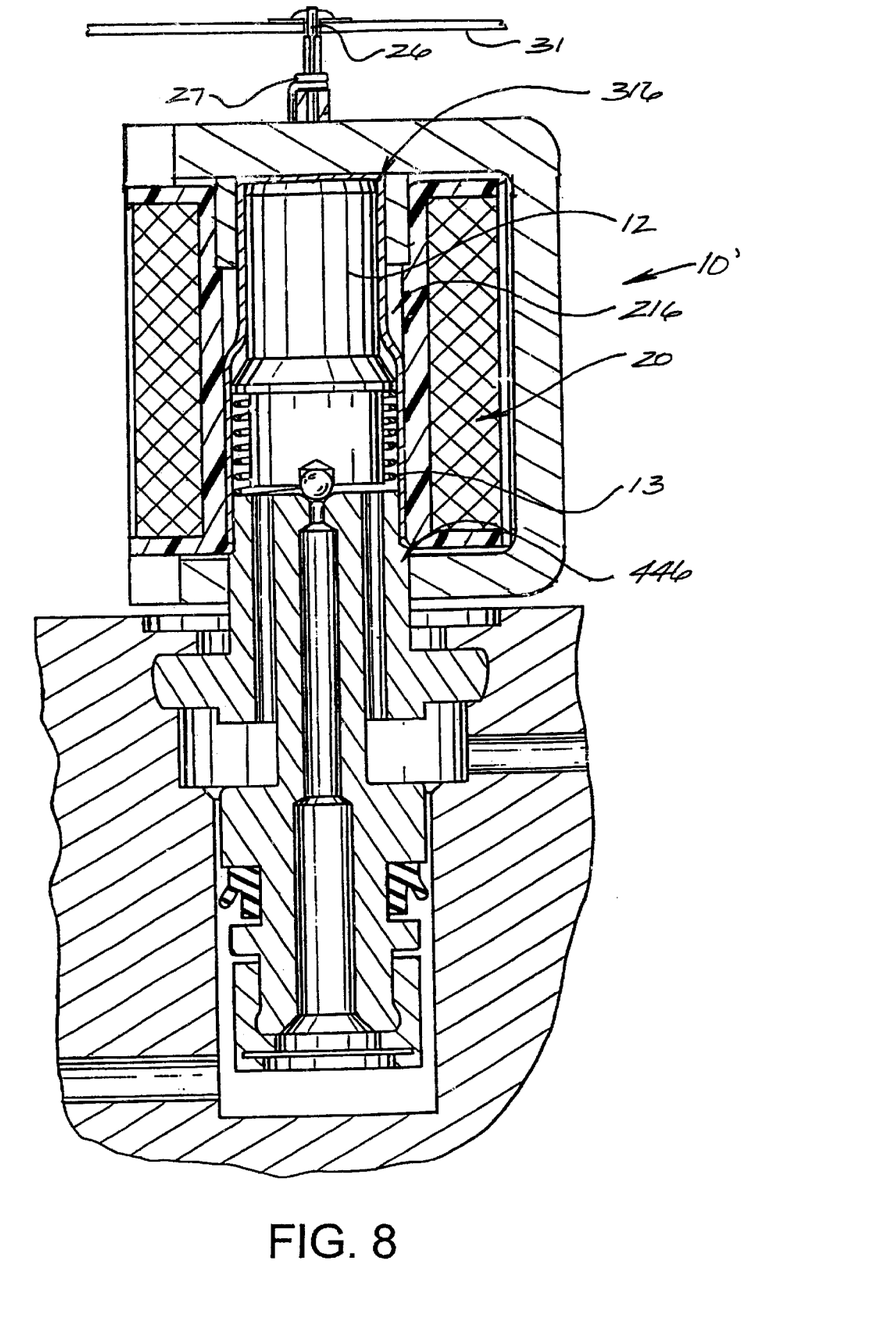
FIG. 8 is a sectional view of a solenoid valve having a coil assembly according to the invention.

Current from the circuit may flow through the coil 20 to produce magnetic flux. The magnetic flux moves or urges the armature 12, shown in FIG. 8, in opposition to the spring 13, closing the valve 10'. As stated above, the ferrule 310 and the bracket 410 serve as a return path for magnetic flux. While a normally open valve is illustrated in FIG. 8, it will be appreciated that the invention also can be practiced upon other types of solenoid valves, such as normally closed valves. A normally closed valve is normally closed by force of a spring and magnetic flux urges the armature in opposition to the spring to open the valve.

Figure 9:
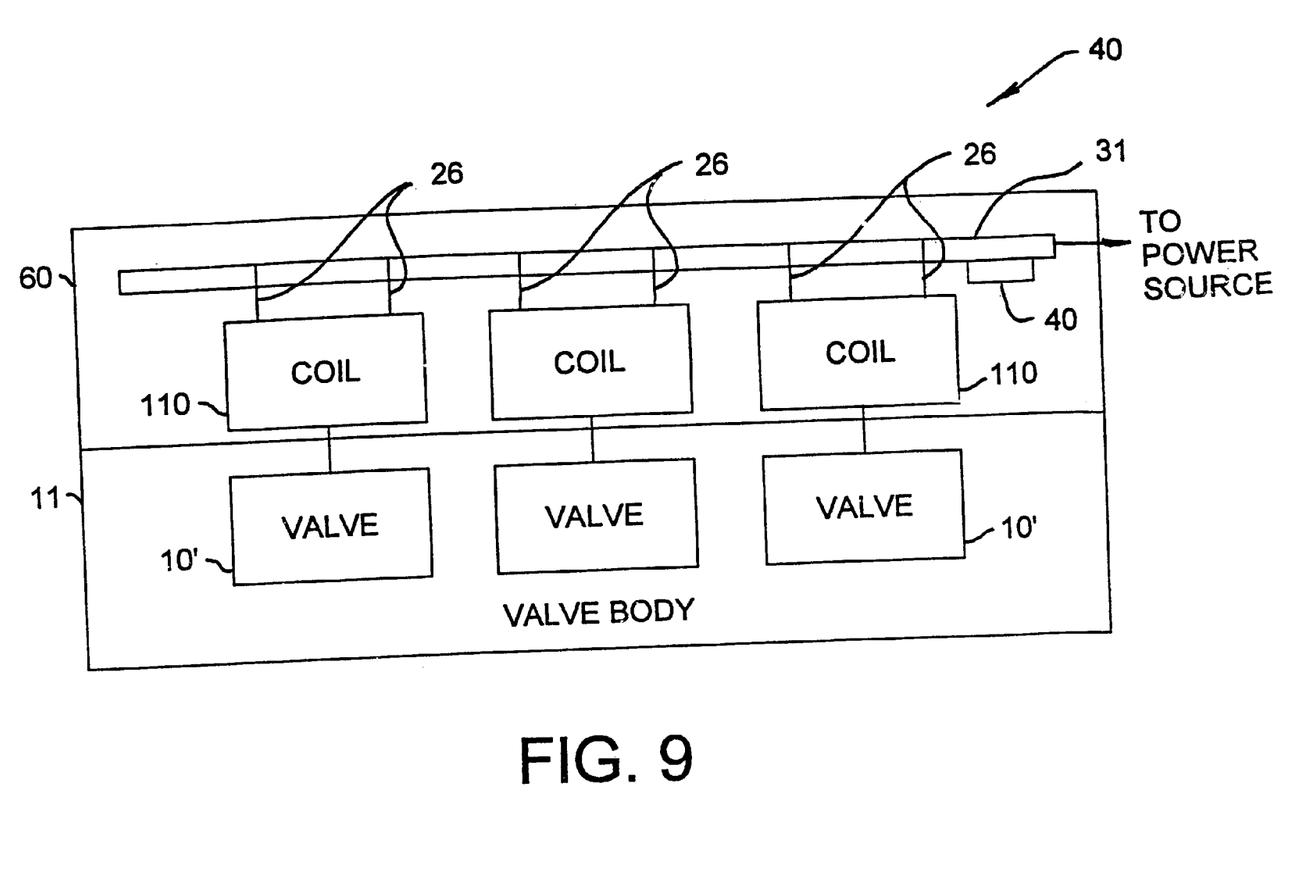
FIG. 9 is a diagrammatic representation of a system comprising a plurality of coils and valves.

As shown in FIG. 9, a plurality of coil assemblies 110 may be used to operate a plurality of valves 10'. A plurality of valves 10' may be supported by a valve body 11. The coil assemblies 110 may be supported by a housing 60. Each valve 10' has an armature 12 which is adapted to cooperate with a corresponding coil assembly 110. The terminal pins 26 of each coil assembly 110 may be connected to a PCB 31. The PCB 31 may form a part of the electrical circuit 30 (shown in FIG. 11B) which controls the operation of the valves 10'. The terminal pins 26 are preferably soldered to a PCB 31 which may support a microprocessor that serves as part of the electronic control module 40. The electronic control module 40 is adapted to produce electrical signals capable of controlling each of the valves 10' independently of one another.

Figure 11A:
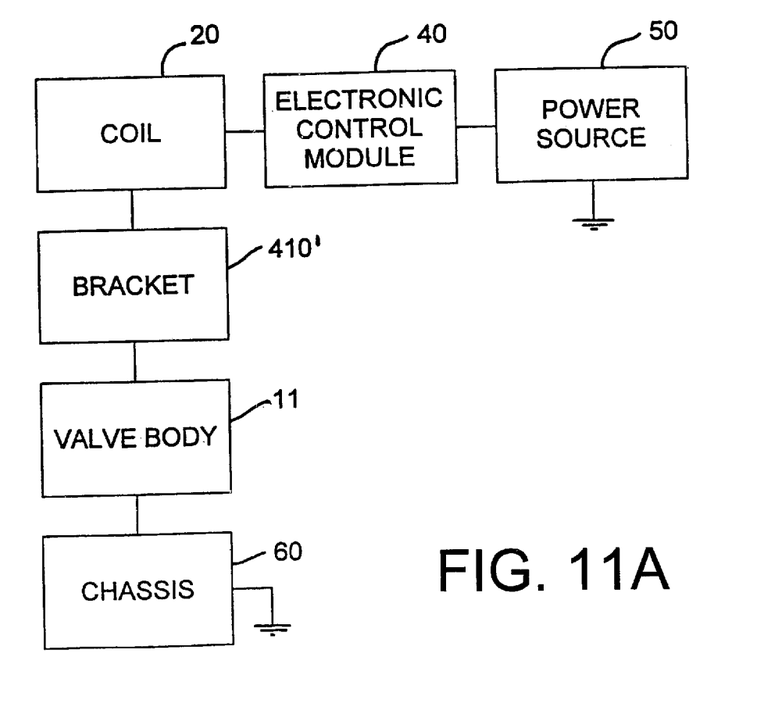
FIG. 11A is an environmental diagrammatic representation of a bobbin having a single terminal pin.
Figure 11B:
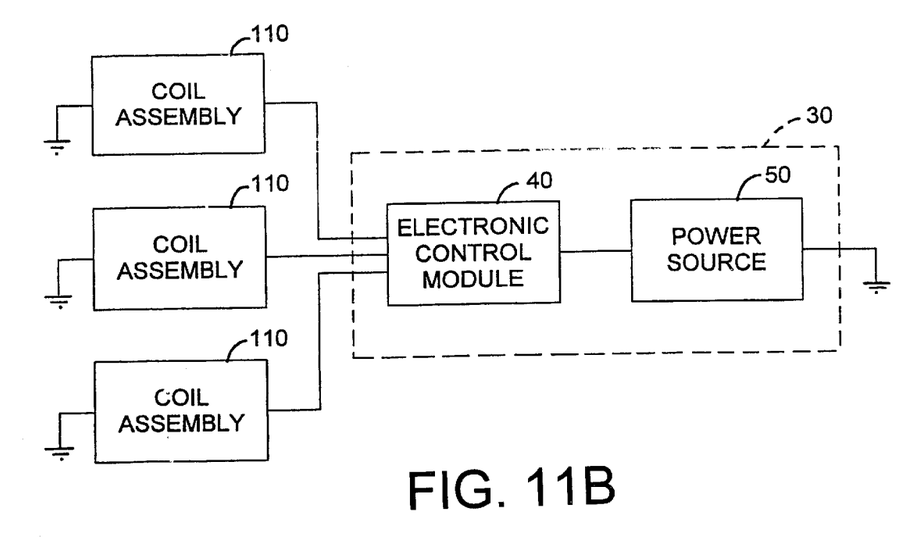
FIG. 11B is a diagrammatic representation of a system comprising a bobbin having a single terminal pin.

It should be noted that a pair of terminal pins 26 may not be required to form a current path through the coil 20. For example, as shown in FIG. 11A, the invention may operate on a DC power source 50, such as an automobile battery. The positive side of the power source 50 may be connected to one terminal pin 26. The negative side of the power source 50 may be connected to the bracket 410. The bracket 410 directly engages the valve body 11. The valve body 11 may be connected to the negative side of the power source 50. For example, the valve body 11 may be supported by the chassis 60 of an automobile. The automobile chassis 60 may be connected to the negative side of the power source 50, or be at ground potential. As shown in FIGS. 11A and 11B, the connection between the chassis 60 and the valve body 11 provides a return path between the power source 50 and the bracket 410.

Figure 13:
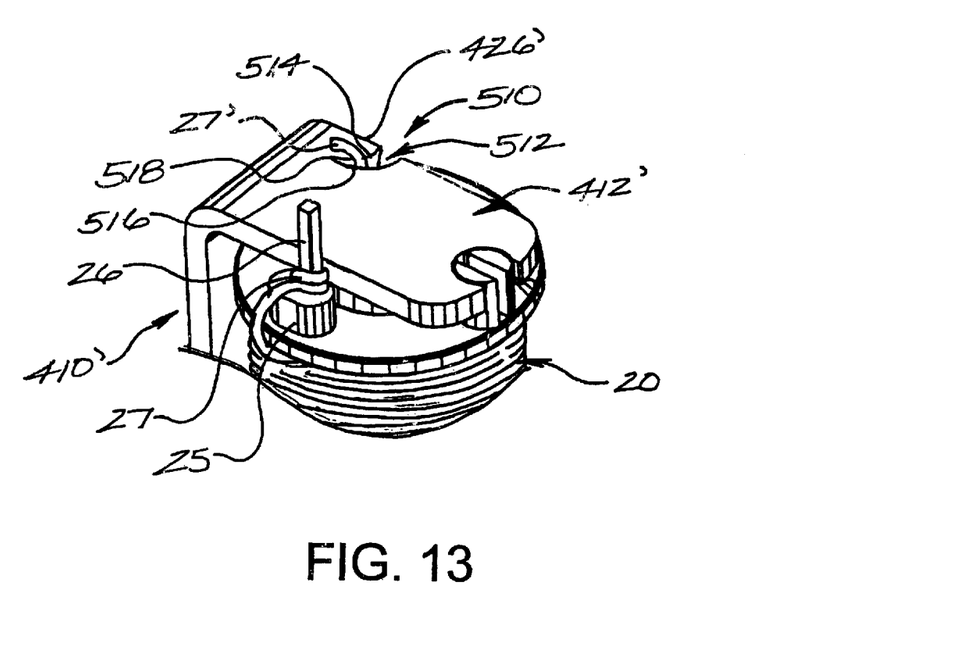
FIG. 13 is a perspective view of an alternative coil assembly.

The coil 20 may be connected to the bracket 410 in any suitable manner. For example, as shown in FIG. 13, a bracket 410' may be provided with a terminal connection. For example, the terminal connection may be in the form of a notch 510 formed in the upper leg 412' of the bracket 410'. In particular, a notch 510 may be provided in one of the opposing sides 426' of the upper leg 412' of the bracket 410'.

The notch 510 includes an opening 512 into which an end 27' of the coil 20 may be inserted. The opening 512 is defined between opposing sides 514 and 516 of the notch 510. The opposing sides 514 and 516 preferably converge and intersect at a point of intersection 518. The converging sides 514 and 516 serve to grip the lead wire of the coil 20 and thus retain the lead wire in the notch 510.

Figure 14:
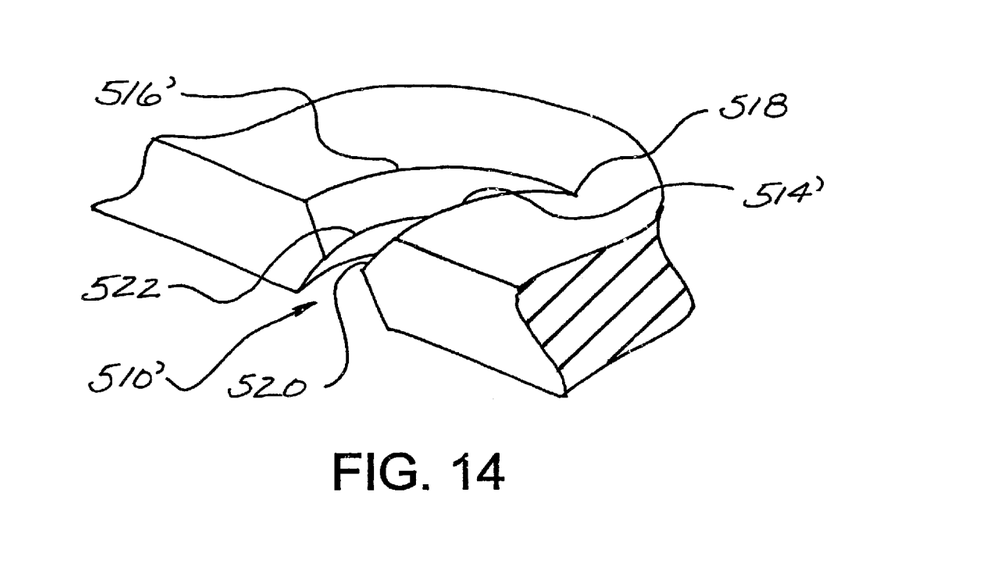
FIG. 14 is an enlarged partial perspective view of the alternative coil assembly shown in FIG. 13.
Figure 15:
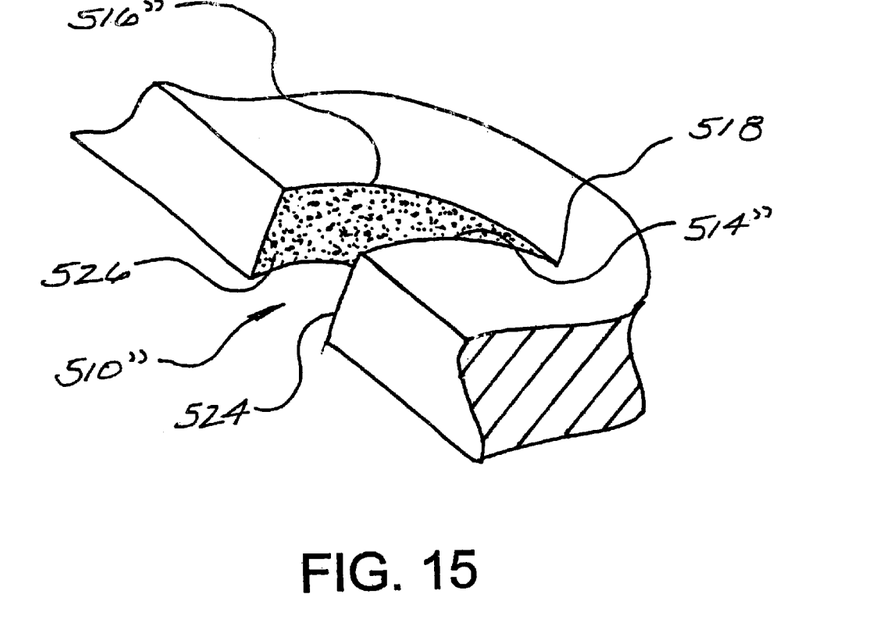
FIG. 15 is an enlarged partial perspective view of an alternative embodiment of the coil assembly shown in FIG. 13.

As set forth above, the coil 20 is formed from a number of turns of electrically conductive material. The electrically conductive material is insulated so that the turns are electrically insulated from one another. The insulation (not shown) should be removed or displaced to insure that a current path is formed between the coil 20 and the bracket 410'. The insulation may be displaced in any suitable manner. For example, the notch 510 may be structured and dimensioned to displace the insulation. As shown in FIG. 14, in addition to converging, a notch 510' may include V-shaped sides 514" and 516' which form sharpened edges 520 and 522. The edges 520 and 522 serve to cut into or through the insulation to make an electrical contact with the electrically conductive material forming the coil 20. Attentively, as shown in FIG. 15, a notch 510" may include sides 514" and 516" of the notch 510" each of which includes an abrasive surface 524 and 526 which abrades through the insulation to contact the electrically conductive material.

As shown in FIG. 11A, the positive side of the power source 50 is connected to an electronic control module 40. The electronic control module 40 includes a PCB 31, such as shown in FIG. 9. The terminal pin 26 is soldered to the PCB 31, such as shown in FIG. 8. As seen in FIG. 13, one coil lead wire 27 is wrapped around the terminal pin 26 so as to make electrical contact with the terminal pin 26. The terminal pin 26 is insulated from the bracket 410' by the terminal pin support 25 so as not to make electrical contact with the bracket 410'. The other coil lead wire 27' is disposed in the notch 510 so as to make electrical contact with the bracket 410'. As shown in FIG. 11A, the bracket 410' makes electrical contact with a valve body 11 that supports a valve controlled by the coil 20. The valve body 11 makes electrical contact with an automobile chassis 60. The chassis 60, in turn, is connected to the negative side of the battery or power source 50. This configuration provides a completed circuit through which current may pass to energize the coil 20 and thus, control the operation of the valve 10'.

Figure 12:
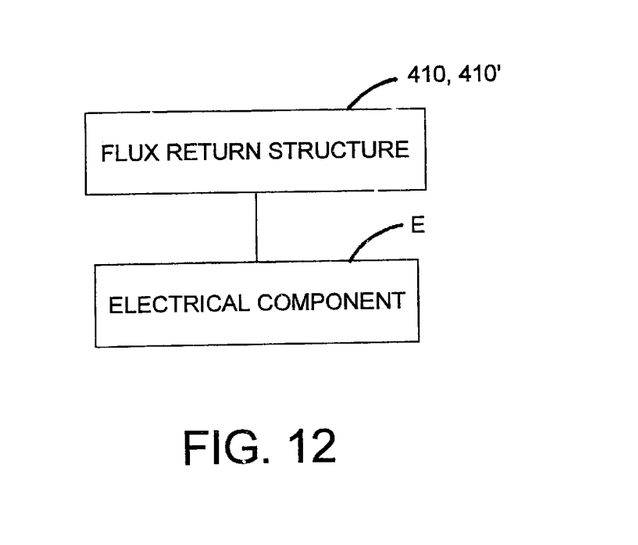
FIG. 12 is a diagrammatic representation of an electronic component carried by the flux return structure.

In addition to providing a return path for magnetic flux, the brackets 410 and 410' may serve as heat sinks for electrical components E, illustrated in FIG. 12. For example, components which dissipate a large amount heat, such as Field Effect Transistors (FET), may form a part of the electrical circuit supported by the PCB 31. Such components can be mounted on the bracket 410. Thus, a portion of each bracket 410 and 410' may serve as a heat sink for such components.

Flux return structures other than the brackets 410 and 410' set forth above may be suitable for carrying out the invention. For example, any suitable structure which provides a current path to the negative side of the power source 50 may be suitable for carrying out the invention.

Structures other than the notch 510 described above may be suitable for forming an electrical connection between a coil lead 27' and a suitable flux return structure.

Alternatively, a coil lead 27' may be connected to a flux return structure which is connected to the positive side of the power source 50 and a coil lead 20 may be connected to the negative side through the electronic control module 40.

Figure 16:
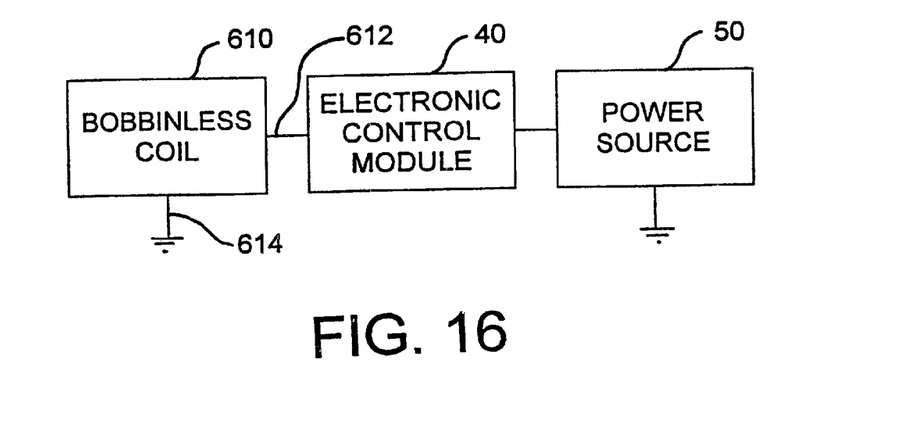
FIG. 16 is a diagrammatic representation of a system having an alternative coil.

The invention may not be limited to a coil 20 supported by a bobbin but rather may include a bobbinless coil 610, as represented in FIG. 16. The bobbinless coil 610 may include coil leads 612 and 614 which are connected to an electrical circuit 30. Although not shown, a bobbinless coil 610 may alternatively include a lead which is connected to the positive side of the power source 50 and another lead which is connected to a negative side of a power source 50.

Figure 17:
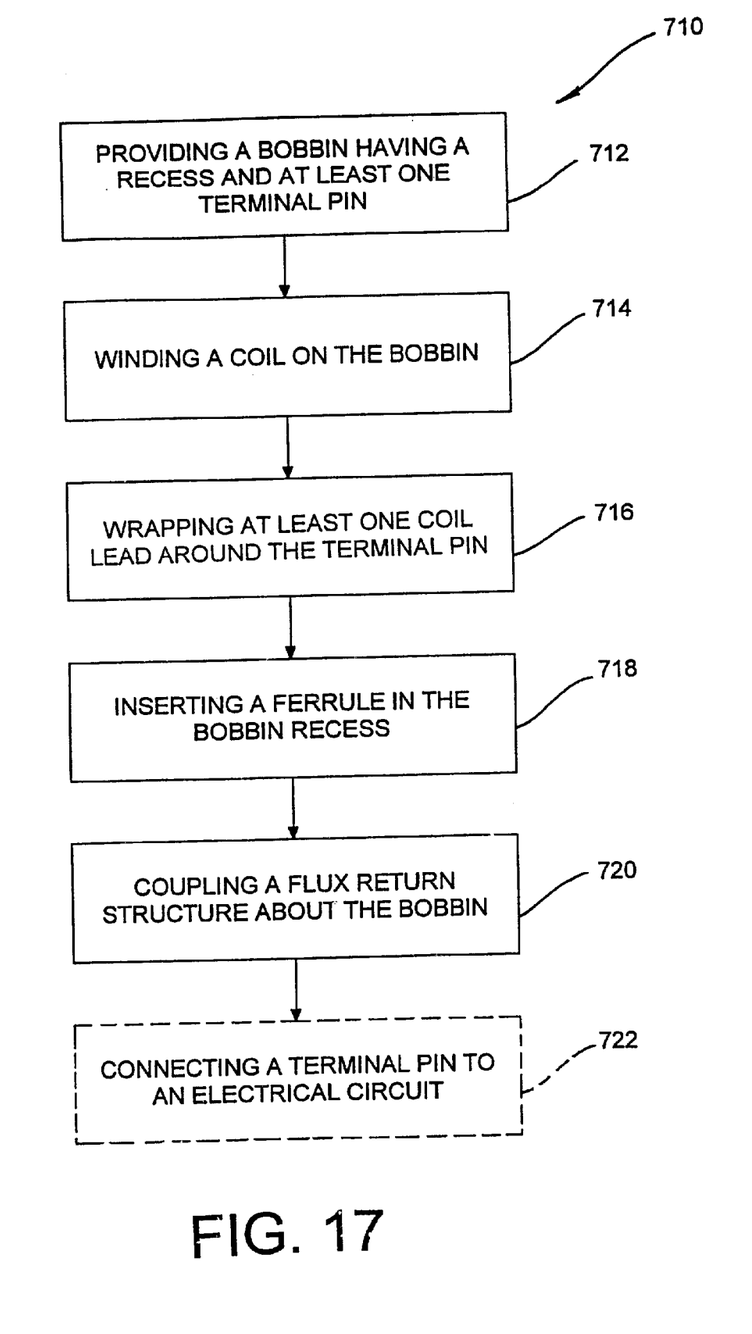
FIG. 17 is a flow chart of a method for assembling a coil assembly.

The invention further includes a method 710 for assembling a coil assembly. As shown in the flow chart in FIG. 17, the method includes the step of providing a bobbin having a recess and at least one terminal pin, as set forth in functional block 712. In functional block 714, a coil is wound on the bobbin. In functional block 716, at least one coil lead is wrapped around the terminal pin. A ferrule is inserted in the bobbin recess in functional block 718. A bracket is coupled to the bobbin in functional block 720. This method 710 may further include an optional step of connecting the terminal pin to an electrical circuit, as set forth in functional block 722.

Figure 18:
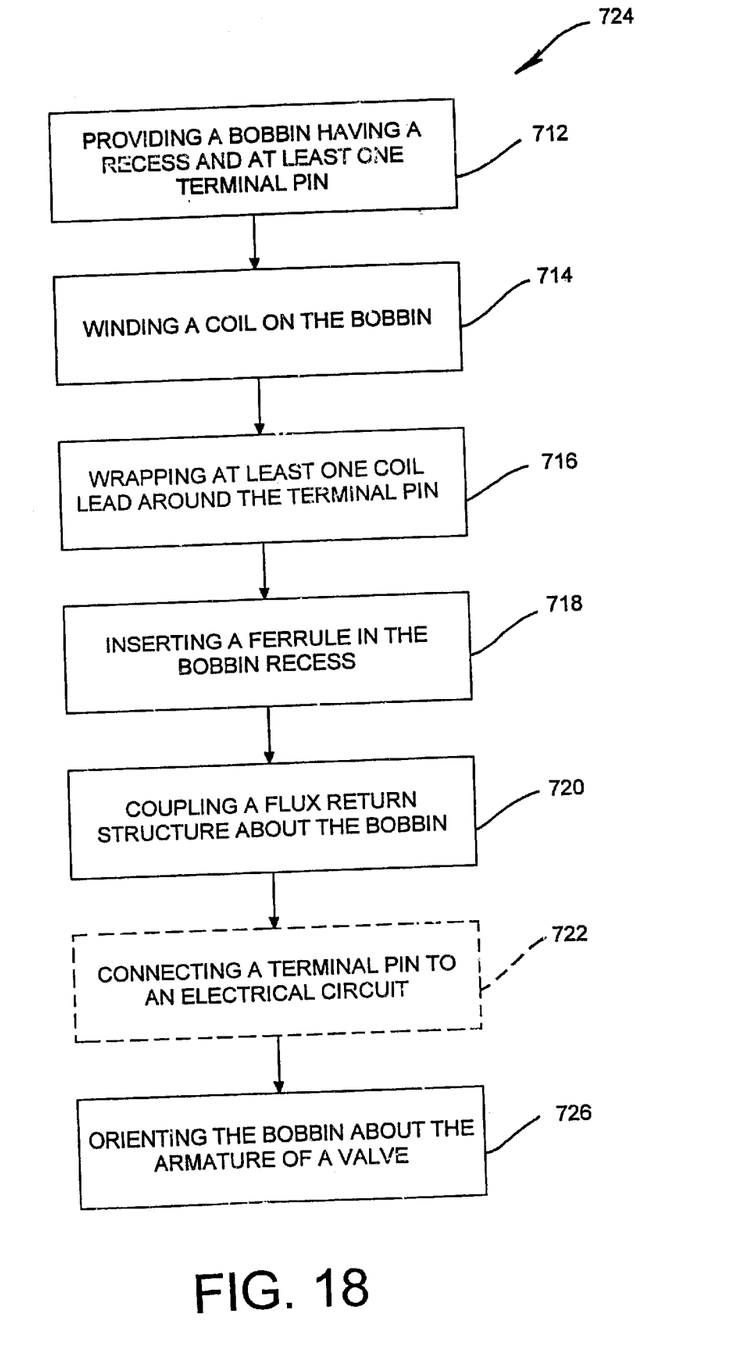
FIG. 18 is a flow chart of a method for assembling a solenoid valve.

In addition to the foregoing steps, a method 724 for assembling a solenoid valve may further include the step of orienting the bobbin about a valve armature, as set forth in functional block 726. As shown in FIG. 18, this method 724 may likewise include an optional step of connecting the terminal pin to an electrical circuit, as set forth in functional block 722.

Figure 19:
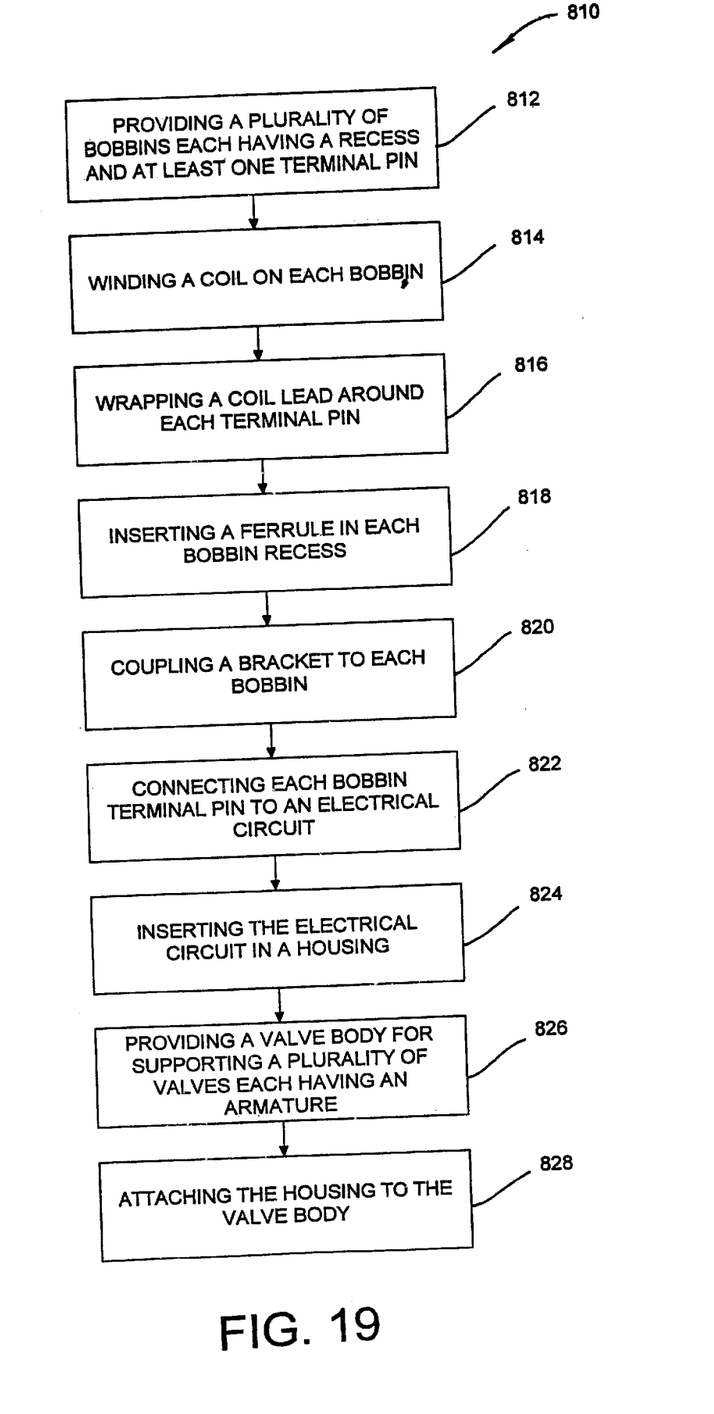
FIG. 19 is a flow chart of yet another method for assembling an electronic control module.

A method 810 for assembling an electronic control module, as shown in FIG. 19, may include the step of providing a plurality of bobbins each having a recess and at least one terminal pin, as set forth in functional block 812. In functional block 814, a coil is wound on each bobbin. In functional block 816, at least one coil lead is wrapped around the bobbin terminal pin. A ferrule is inserted in each bobbin recess in functional block 818. A bracket is coupled to each bobbin in functional block 820. In functional block 822, each bobbin terminal pin is connected to an electrical circuit. In functional block 824, the electric circuit is inserted in a housing. A valve body supporting a plurality of valves each having an armature is provided in functional block 826. In functional block 828, the housing is attached to the body so as to orient each bobbin about a valve armature.

Figure 20:
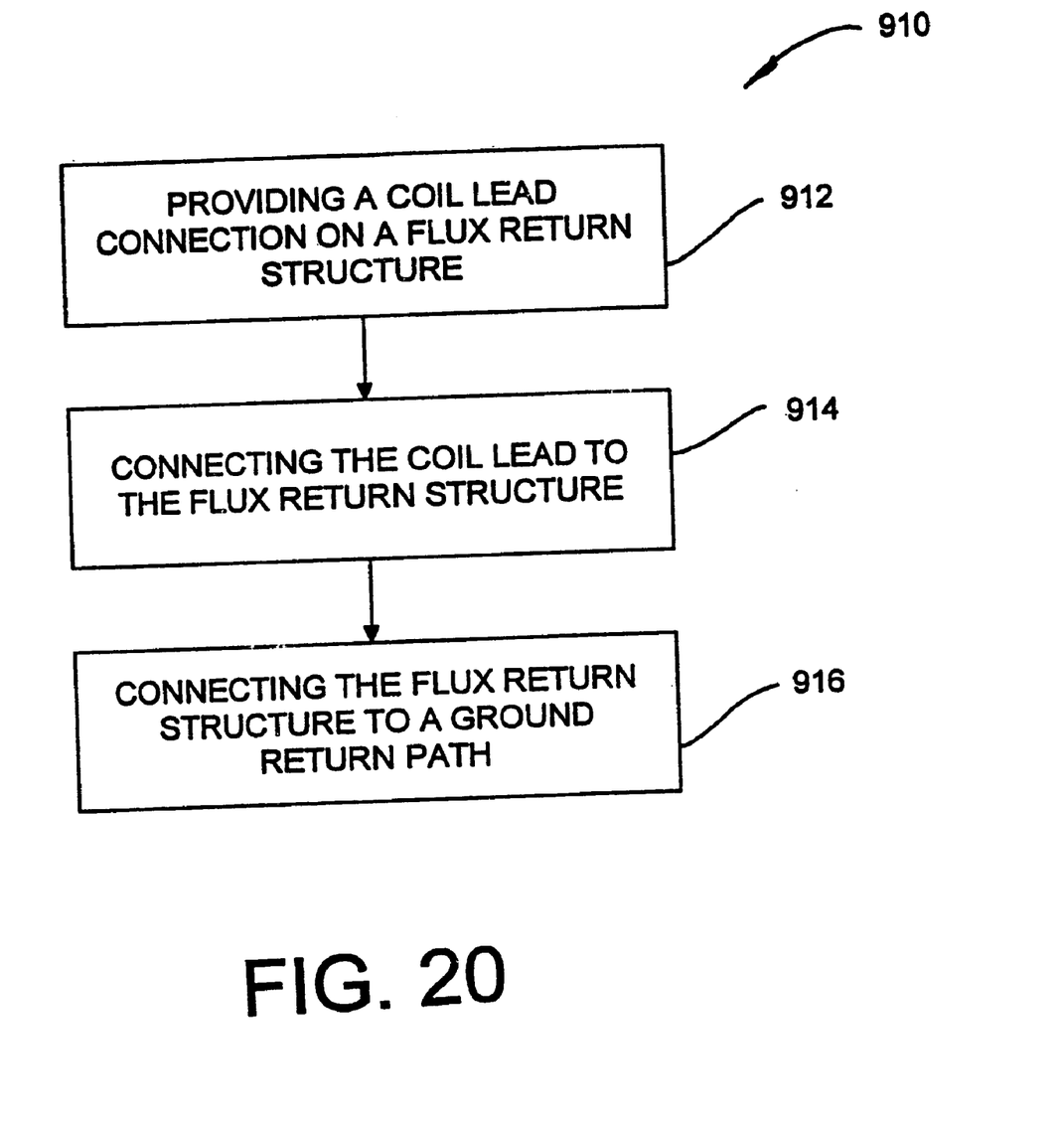
FIG. 20 is a flow chart of still another method for providing a ground path for a solenoid valve.

The method 910 for providing a ground path for a solenoid valve, as shown in FIG. 20, may include the step of providing coil lead connections on the bracket, as set forth in functional block 912. In functional block 914, a coil lead is connected to the bracket. The bracket is connected to a ground return path in function block 916. This method may be practiced in conjunction with any of the foregoing methods 710, 724 and 810.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the preferred embodiment has been illustrated and described as being utilized in anti-lock brake systems, it will be appreciated that the invention also may be practiced with other systems, such as traction control and vehicle stability systems.

What is claimed is:

1. A coil assembly for a solenoid valve comprising:
    a bobbin having an annular recess and a bore formed therethrough and a flange formed on each end thereof with at least one of said flanges having at least one coupling element extending from an outer surface thereof;
    a metal ferrule supported by said annular recess; and
    a one-piece C-shaped metal bracket having first and second legs extending from a mid-portion, said legs defining a space for receiving said bobbin and retaining said metal ferrule in said annular recess, at least one of said legs having an end provided with a cutout and one of said legs having an aperture formed transversely therethrough, said aperture being separate from said cutout and coaxial with said bobbin bore, said cutout being substantially cylindrical in shape and communicates with said end of at least one of said legs so as to form a restrictive opening, said coupling element including a pair of spaced semi-cylindrical flanges adapted to pass through said restrictive opening, said coupling element being engageable with said cutout to releasably couple said metal bracket to said bobbin, said aperture being adapted to receive a valve armature, said metal ferrule and said metal bracket being arranged to cooperatively serve as a return path for magnetic flux.

2. The coil assembly of claim 1, wherein at least one insulated terminal pin support extends from said bobbin and said upper leg extends adjacent to said terminal pin support.

3. The coil assembly of claim 1, wherein the coil assembly is one of a plurality of coil assemblies for operating a plurality of valves.

4. The coil assembly of claim 3, wherein said coil assemblies are supported within a single housing.

5. The coil assembly of claim 1, wherein said metal bracket carries an electrical component, said metal bracket forming a heat sink for said electrical component.

* * * * *

UNITED STATES PATENT AND TRADEMARK OFFICE
CERTIFICATE OF CORRECTION

PATENT NO. : 6,362,717 B1            Page 1 of 1
DATED : March 26, 2002
INVENTOR(S) : Doug G. Lewin It is certified that error appears in the above-identified patent and that said Letters Patent is hereby corrected as shown below:

<u>Column 8,</u>
Line 19, after "spaced" insert -- apart --.

Signed and Sealed this

Twenty-eighth Day of May, 2002

Attest:

Attesting Officer

JAMES E. ROGAN
*Director of the United States Patent and Trademark Office*